(12) United States Patent
Morita et al.

(10) Patent No.: US 6,474,978 B2
(45) Date of Patent: Nov. 5, 2002

(54) MAGNETIC TAPE CASSETTE MOLDING APPARATUS

(75) Inventors: Kiyoo Morita, Kanagawa (JP); Katsuki Asano, Kanagwa (JP); Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/875,148

(22) Filed: Jun. 7, 2001

(65) Prior Publication Data

US 2001/0026030 A1 Oct. 4, 2001

Related U.S. Application Data

(62) Division of application No. 09/098,460, filed on Jun. 17, 1998, now abandoned.

(30) Foreign Application Priority Data

Jun. 18, 1997 (JP) .............................................. 9-161441

(51) Int. Cl.[7] .............................................. B29C 45/40
(52) U.S. Cl. ........................ 425/556; 264/334; 425/577
(58) Field of Search ................. 425/577, 556; 264/334

(56) References Cited

U.S. PATENT DOCUMENTS

| | | | |
|---|---|---|---|
| 2,483,093 A | 9/1949 | Harvel | 249/68 |
| 2,592,296 A | 4/1952 | Kutik | 264/328 |
| 3,049,758 A | 8/1962 | Drevales | 425/438 |
| 3,987,144 A | 10/1976 | Nickold | 264/318 |
| 4,198,371 A | 4/1980 | Holmes | 264/318 |
| 4,610,621 A | 9/1986 | Taber et al. | 425/DIG. 58 |
| 4,650,136 A | 3/1987 | Tsuruta | 242/338.3 |
| 5,538,678 A | 7/1996 | Ishikawa | 264/318 |
| 5,846,473 A | 12/1998 | Sorensen et al. | 264/318 |

FOREIGN PATENT DOCUMENTS

| | | |
|---|---|---|
| DE | 3414020 | 10/1984 |
| GB | 1 338 793 | 11/1973 |

OTHER PUBLICATIONS

Patent Abstracts of Japan, vol. 9, No. 249 (M–419), Oct. 5, 1986 & JP 60 099619 A (Matsushita Denki Sangyo KK) Jun. 3, 1985 Abstract.

*Primary Examiner*—Tim Heitbrink
(74) *Attorney, Agent, or Firm*—Sughrue Mion, PLLC

(57) ABSTRACT

A mold apparatus for forming a pair of mutually opposing guide walls respectively disposed and erected on an upper surface of a half-case of a magnetic tape cassette. The mold apparatus is divided into a third mold and a second mold, and the guide walls to be molded form the boundary between the third and second molds. After injecting resin into the mold apparatus in order to mold the guide walls, the second mold of the mold apparatus is firstly removed in the guide wall erected direction. Then, the third mold of the mold is removed in the same direction, while a distance between the formed guide walls is enlarged by elastic deformation resulting from contact between the guide walls and the third mold.

6 Claims, 5 Drawing Sheets

MAGNETIC TAPE CASSETTE MOLDING APPARATUS

This is a divisional of application Ser. No. 09/098,460 (Confirmation No.: Not Assigned) filed Jun. 17, 1998, now abandoned the disclosure of which is incorporated herein by reference.

BACKGROUND OF THE INVENTION

1. Field of the Invention

The present invention relates to a method for molding a magnetic tape cassette such as a video tape cassette and the like, and more particularly, for molding guide walls of a brake member, in the magnetic tape cassette, which prevents a magnetic tape from loosening. In addition, the present invention relates to an apparatus in which the above-mentioned molding method is operable.

2. Description of the Related Art

Conventionally, there are known various types of magnetic tape cassettes that can be used in a video deck. As an example of the magnetic tape cassettes, there are relatively small-sized magnetic tape cassettes used in a digital video cassette (DVC).

FIG. 4 is an exploded view of a general magnetic tape cassette 30 that is structured in the following manner. A pair of reels 32a and 32b is rotatably disposed on a lower half-case 31 (hereinafter referred to as "lower half"). Around the two reels 32a and 32b, a magnetic tape T (not shown in FIG. 4) is wound. The magnetic tape T is guided by two tape guides 33a and 33b located at the right and left sides of the front end of the cassette 30. The two tape guides 33a and 33b allow the magnetic tape to pass through an opening 34 formed on the front end side of the lower half 31. As shown in FIG. 4, teeth 35a and 35b are formed along the entire peripheral edges of the lower flanges 32La and 32Lb of the two reels 32a and 32b.

As also shown in FIG. 4, a brake member 38 is provided between the two reels 32a and 32b in a space 36 located on the rear side of the lower half 31. The brake member 38 prevents the magnetic tape T from loosening when the magnetic tape cassette 30 is not loaded in a video deck (not shown), but is instead located in a storage place or is being carried.

A pair of securing pawls 37a and 37b is provided near the front end of the brake member 38. The securing pawls 37a and 37b form a lock member to lock the rotation of the reels 32a and 32b together with the brake member 38. In addition, a compression spring (brake spring) 39 is provided at the rear end of the brake member 38 in the lower half-case 31. The compression spring is used to urge the brake member 38 towards the front side of the lower half-case 31.

As shown in FIG. 4, an upper half-case 40 (hereinafter referred to as "upper half") cooperates with the lower half 31 to form the magnetic tape cassette 30. The upper half 40 includes a lid for covering the opening in the front end portion of the lower half 31. The lid is composed of an outer lid 41, an upper lid 42, and an inner lid 43. The opening can be freely opened and closed using these lids.

The outer lid 41 of the upper half 40 includes a side plate 44 having a projecting lock pin 45. Correspondingly, a lid lock 47, which is rotatably mounted on one side plate 46 of the lower half 31, locks the outer lid 41 of the upper half 40 by engaging with the lock pin 45. A plate spring 48 urges the lid lock 47 toward the locking side thereof.

As shown in FIG. 4, a rotary shaft 44b projects from an inner side of the side plate 44 of the outer lid 41. A lid spring 49, which is mounted on the rotary shaft 44b, is used to open and close the outer lid 41. In FIG. 4, reference numerals of components other than main components of the magnetic tape cassette 30 are omitted, since descriptions thereof are not believed to be essential for an understanding of the general cassette 30.

FIG. 5 shows a conventional lock device for locking the rotation of the reels 32a and 32b of the general magnetic tape cassette 30 described above with reference to FIG. 4. In the conventional lock device, the brake member 38 is urged in the forward direction, which is the direction in which the compression spring 39 (brake spring) is compressed. The compression spring 39 is supported along the floor surface 31a of the lower half 31 shown in FIG. 4, and has one end engaged with the floor surface 31a and the other end engaged with the rear end of the brake member 38. The compression spring 39 urges the brake member 38 in the forward direction when the cassette 30 is not loaded in a video deck. An insertion hole 51 is formed substantially in the central portion of the bottom surface 38a of the brake member 38. A lock release pin of the video deck (not shown) is inserted into the insertion hole 51 of the brake member 38 when the magnetic tape cassette 30 is loaded in a video deck, thereby allowing the reels 32a and 32b to rotate.

A pair of guide walls 52a and 52b is provided on the left and right positions of the insertion hole 51, and slidingly guides movement of the brake member 38. Facing brake member removal-prevention projections 53a and 53b are provided on the upper ends of the two guide walls 52a and 52b so as to prevent the brake member 38 from being removed from the cassette 30.

As described above, the two guide walls 52a and 52b are conventionally provided on the left and right sides of the brake member 38. The two guide walls 52a and 52b are located to the left and right of the insertion hole 51 because it is necessary to facilitate the removal of molds employed in a resin injection-molding method. FIG. 6 is a cross-sectional view of a metal mold 120 used for explaining the conventional molding method. The metal mold 120 is used to mold the lower half 31 of the cassette 30, and is composed of an upper mold UM and a lower mold LM. The lower mold LM has a component mold CM for molding inner surfaces of the guide walls 52a and 52b. As shown in FIGS. 5 and 6, if the two guide walls 52a and 52b are erected on the lower half 31 and are disposed adjacent to the insertion hole 51, the component mold CM may be easily removed in the direction L6 after completion of the injection-molding.

However, the location of the pair of guide walls 52a and 52b has drawbacks in that the brake member removal-prevention projections 53a and 53b, which are provided on the upper ends of the guide walls 52a and 52b, do not sufficiently hold the brake member 38. In other words, the pair of guide walls 52a and 52b holds only the substantially central portion of the brake member 38. As a result, the brake member 38 can fly out or slip off from the two guide walls 52a and 52b due to the urging force of the compression spring 39 in the assembled magnetic tape cassette.

In view of the above-described drawback, it is preferable to support the brake member 38 using two or more pairs of guide walls respectively with brake member removal-prevention projections that are the similar to those identified with reference numerals 53a and 53b. For example, as shown in FIG. 2, if two pairs of guide walls have brake member removal-prevention projections, the brake member 38 can be supported in both the front and rear end portions. However, such an arrangement requires that the two pairs of guide walls should be located far from the is insertion hole 51.

Moreover, the conventional apparatus and methods cannot be used to injection-mold such a two-pair structure because the component mold CM exists between the two guide walls 52a and 52b. As described above, the component mold CM is conventionally removed from the insertion hole 51 in the direction L6, as shown in FIG. 6. Therefore, the component mold CM cannot be removed because the brake member removal-prevention projections 53a and 53b mutually overhang and prevent the component mold CM from being removed in the direction L6.

SUMMARY OF THE INVENTION

It is an object of the present invention to overcome the above-mentioned drawbacks found in the conventional magnetic tape cassette molding method and apparatus. That is, it is an object of the present invention to provide a magnetic tape cassette molding method that more easily molds guide walls for holding a brake member.

A further object of the present invention is to provide an apparatus for performing the above method.

The above object can be attained by a mold apparatus for injection-molding a magnetic tape cassette having a pair of mutually opposing guide walls respectively erected on an upper surface of a half-case of the magnetic tape cassette. The opposing guide walls slidably support a brake member that locks rotations of a pair of tape winding reels disposed within the magnetic tape cassette. Each of the guide walls has a projection for preventing the brake member from being dislodged from between the guide walls. The mold apparatus comprises a first mold, a second mold and a third mold. The first mold, which is removable in a direction that is opposite the erected direction of the guide walls, forms a lower surface of the half-case. The second mold, which is removable in the erected direction of the guide walls, forms outer side surfaces of the guide walls. The third mold, which is removable in the erected direction of the guide walls, forms inner side surfaces of the guide walls that are brought into contact with the brake member. The third mold includes grooved portions respectively forming the projections of the guide walls. When assembled, the first, second and third molds form a molding cavity defined by the pair of mutually opposing guide walls.

In the above-mentioned construction, it is preferable that the projections of the apparatus are respectively positioned at leading ends of the guide walls.

Each of the projections of the apparatus, whether or not the projections of the apparatus are respectively positioned at leading ends of the guide walls, may have a surface that curved in cross section.

At least two pairs of the guide walls of the apparatus, whether or not the projections of the apparatus are respectively positioned at leading ends of the guide walls, are arranged at a predetermined interval in a sliding direction of the brake member.

Further, in accordance with the present invention, there is provided a method for injection-molding a magnetic tape cassette using a molding apparatus such as the one described immediately above. The method comprises the steps of forming a molding cavity using first, second and third molds such as the ones described above, molding molten resin into the molding cavity so as to form the mutually opposing guide walls, and then removing the second and third molds. The second mold is removed first, in the erected direction of the guide walls, so as to release the second mold from the molded guide walls. The third mold is then removed in the erected direction of the guide walls, while a distance between the projections formed on the guide walls is enlarged due to elastic deformation of the guide walls resulting from contact between the third mold and the projections formed on the guide walls.

In addition, the method may further comprise the step of guiding the removal of the third mold using the projections, wherein each of the projections has a surface that is curved in cross section.

DETAILED DESCRIPTION OF THE PREFERRED EMBODIMENTS

Figure 1:
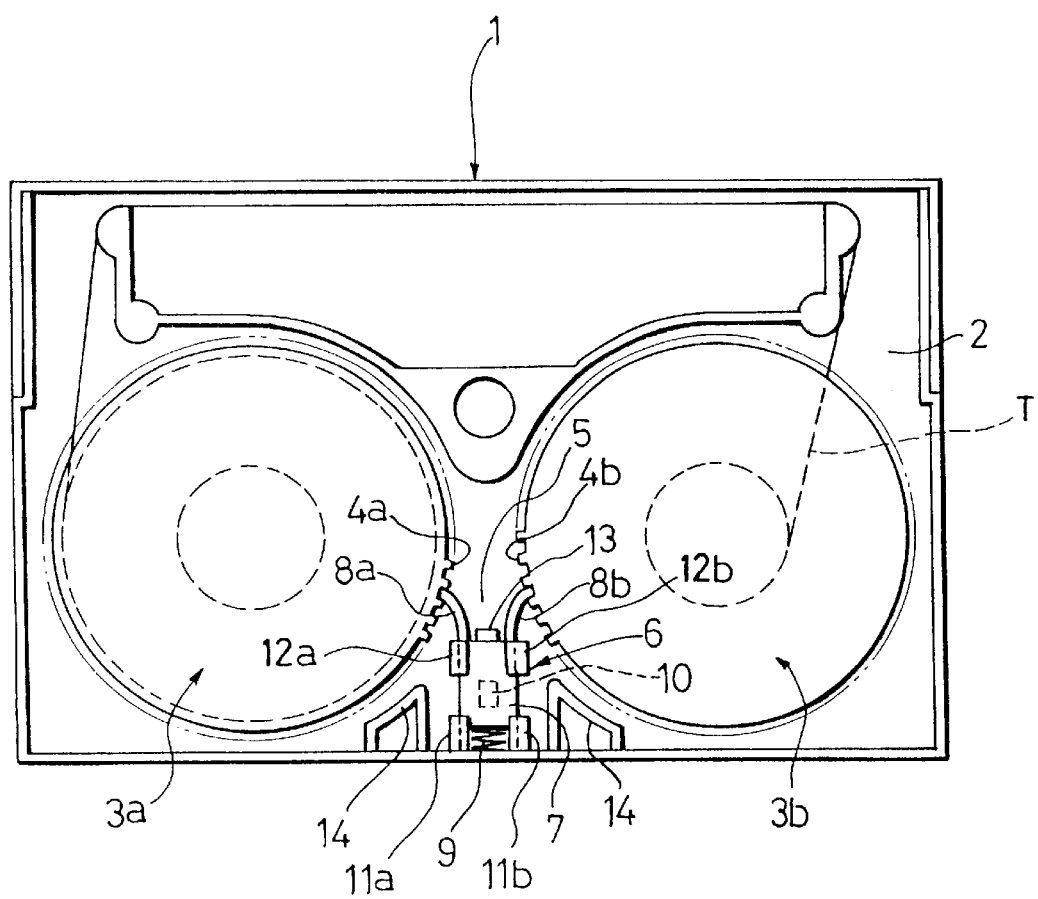
FIG. 1 is a plan view of the magnetic tape cassette molded by the magnetic tape cassette molding method according to the present invention.
Figure 2:
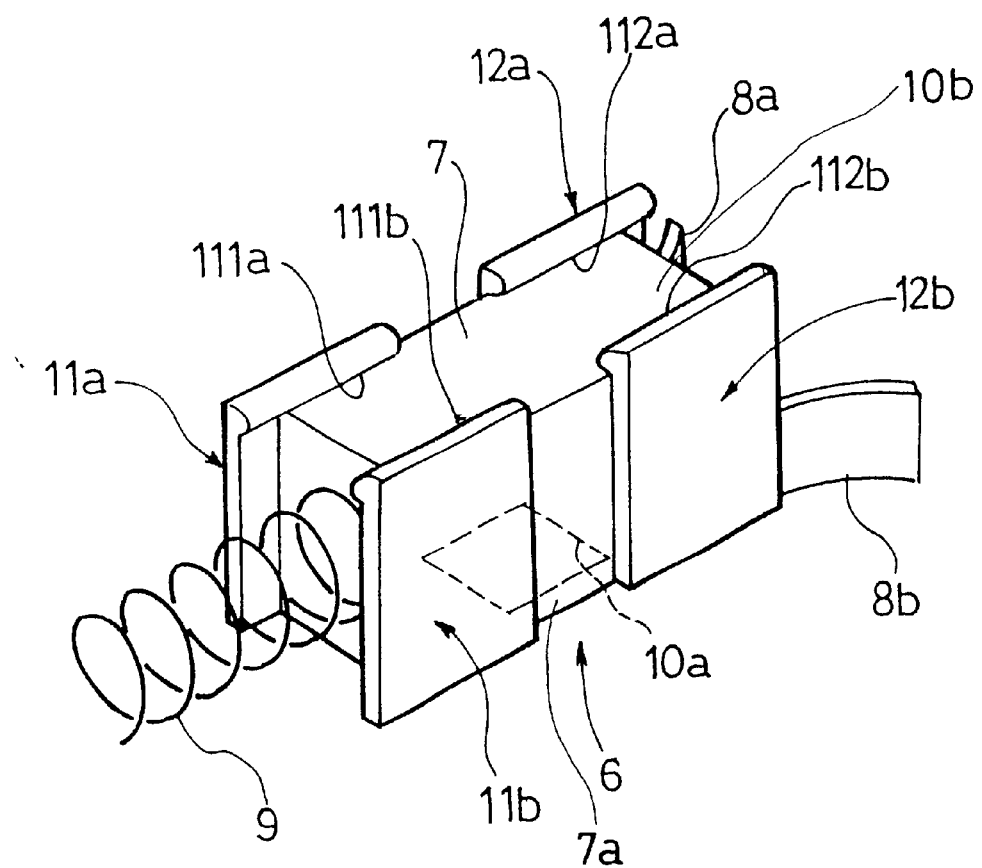
FIG. 2 is an enlarged perspective view of the main portions of the magnetic tape cassette shown in FIG. 1.

FIGS. 1 to 3(A–C) show an embodiment of an apparatus for molding a magnetic tape cassette according to the present invention. Referring to FIG. 1, a magnetic tape cassette 1 includes an upper half (not shown in FIG. 1) and a lower half 2. A pair of freely rotatable reels 3a and 3b, having a magnetic tape T wound therearound, may be provided in the lower half 2. Teeth 4a and 4b extend along the entire peripheral edge of each of the lower flanges of the two reels 3a and 3b, respectively. The teeth 4a and 4b engage with securing pawls 8a and 8b (to be discussed further below).

Figure 4:
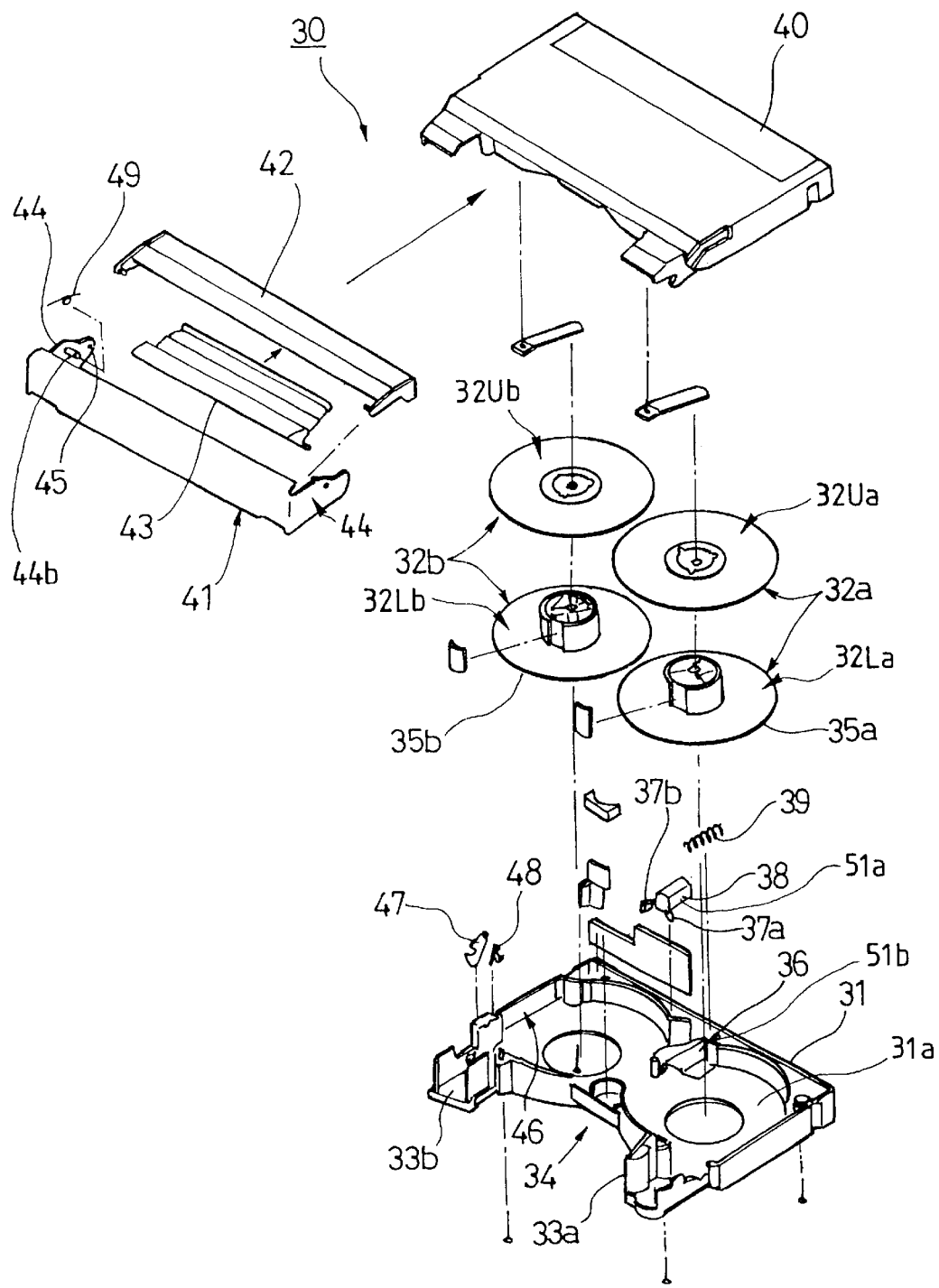
FIG. 4 is an exploded perspective view of a conventional magnetic tape cassette.
Figure 5:
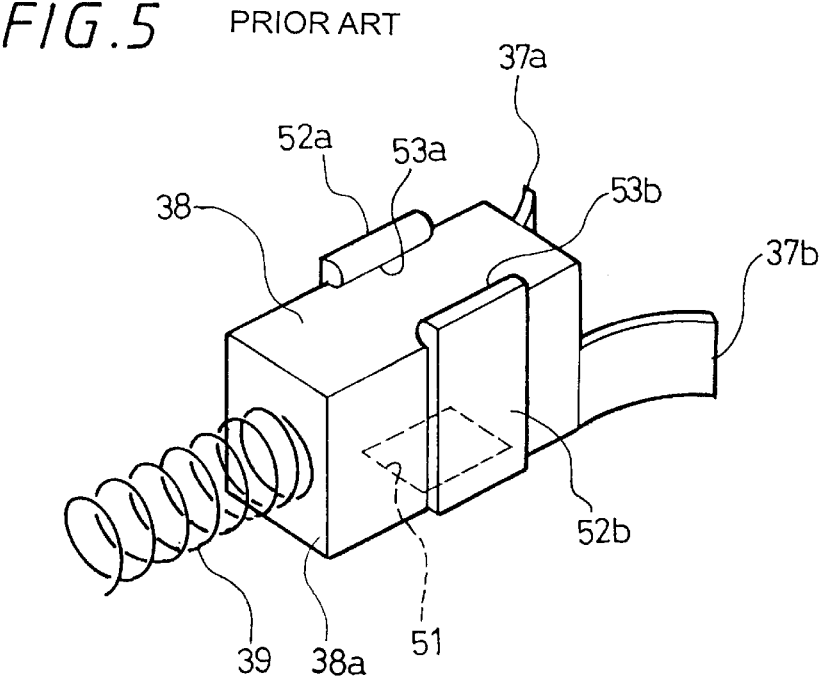
FIG. 5 is an enlarged perspective view of the main portions of the conventional magnetic tape cassette of FIG. 4.
Figure 6:
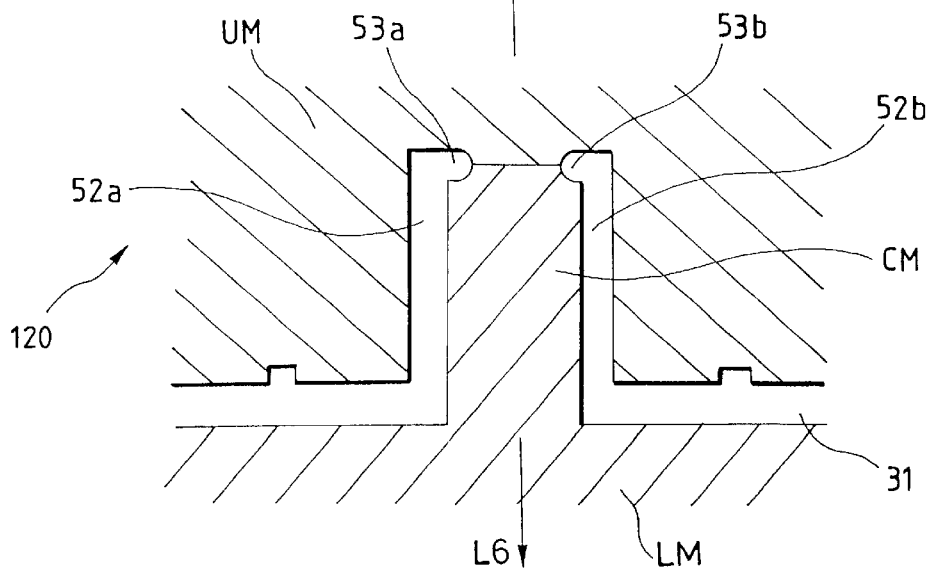
FIG. 6 is a sectional view of a metal mold used for explaining the conventional magnetic tape cassette molding method.

A lock device 6 is provided in a substantially triangle-shaped space 5, which is located between and defined by the two reels 3a and 3b. The lock device 6 locks the rotation of the two reels 3a and 3b, and prevents the magnetic tape T from loosening when the magnetic tape cassette 1 is not loaded in a video deck (not shown). Elements or mechanisms, other than the lock device 6 of the present invention, are the same as those of the general magnetic tape cassette discussed above with reference to FIG. 4, and thus descriptions thereof are omitted here.

The lock device 6, as shown in FIG. 2, comprises a brake member 7, two securing pawls 8a and 8b and a compression spring 9. The brake member 7 is slidably interposed between the two reels 3a and 3b to lock the reels 3a and 3b, while the two securing pawls 8a and 8b are respectively provided on the two sides of the leading end portion of the brake member 7. The two securing pawls 8a and 8b engage with the teeth 4a and 4b that are formed on the reels 3a and 3b, and lock the reels 3a and 3b in place. The compression spring 9 urges the brake member 7 toward the reels 3a and 3b when the cassette 1 is not loaded in the video deck.

As mentioned above, movements of the brake member 7 result in the lock and release of the reels 3a and 3b. This is accomplished by forming a releasing pin insertion hole 10 on the floor surface 31a of the lower half 2 (shown in FIG. 4), and a corresponding releasing pin insertion hole 10a in the lower surface 7a of the brake member 7. When the magnetic tape cassette is loaded into the video deck, a releasing pin of the video deck (not shown) is inserted into the two releasing pin insertion holes 10 and 10a. This insertion of the releasing pin causes the brake member 7 to return to its original position, and unlock the two reels 3a and 3b.

Two pairs of guide walls 11a, 11b and 12a, 12b are provided on the left and right sides of the brake member 7, far from the releasing pin insertion hole 10. In other words, the two pairs of guide walls 11a, 11b and 12a, 12b are located at the front and rear end portions of the sliding area of the brake member 7, and are used for guiding the sliding movements of the brake member 7. Brake member removal-prevention projections 111a, 111b and 112a, 112b are provided at the respective leading ends of the two pairs of guide walls 111a, 111b and 12a, 12b. The brake member removal projections 111a, 111b and 112a, 112b project and overhang inwardly to support the brake member 7 at the top surface 10b of the brake member 7, so as to prevent the sliding brake member 7 from dislodging from the guide walls 11a, 11b and 12a, 12b.

Therefore, the two pairs of guide walls 11a, 11b and 12a, 12b can smoothly guide the sliding brake member 7. In addition, the brake member removal-prevention projections 111a, 111b and 112a, 112b, which are additionally provided on the two pairs of guide walls 11a, 11b and 12a, 12b, can prevent the brake member 7 from dislodging from the two pairs of guide walls 11a, 11b and 12a, 12b.

Each of the surfaces of the respective upper end portions of the brake member removal-prevention projections 111a, 111b and 112a, 112b is preferably curved in cross section. The curved surfaces facilitate the insertion, during assembly, of the brake member 7 from the uppermost portion of the guide walls 11a, 11b and 12a, 12b. In order to insert the lock device 6 between the guide walls 11a, 11b and. 12a, 12b, pressure is applied to the brake member 7 in the downward direction. The pressure can cause the guide walls 11a, 11b and 12a, 12b to be elastically flexed in the transverse direction, thereby widening the space between the guide walls 11a, 11b and 12a, 12b and allowing the brake member 7 to pass. For this reason, it is preferable that each upper surface of the brake member removal-prevention projections 111a, 111b and 112a, 112b is curved in cross section.

Further, in FIG. 1, when the magnetic tape cassette 1 is not loaded in the video deck, the compressing force of the spring 9 urges the brake member 7 toward the reels 3a and 3b. This compression force thereby forces the securing pawls 8a and 8b, which are provided on the leading end portion of the brake member 7, into engagement with the teeth 4a and 4b formed on the peripheral edges of the lower flanges of the rotating reels 3a and 3b. Under such a condition, the reels 3a and 3b are locked, and the magnetic tape can be prevented from slackening.

On the other hand, when the magnetic tape cassette 1 is loaded into the video deck, the locking of the reels 3a and 3b can be released by a locking release pin (not shown) provided in the video deck. As shown in FIG. 1, a stopper 13, located in the substantially triangle-shaped space 5 at a position near the center of the lower half 2, is provided to restrict the moving range of the brake member 7. Additionally, ribs 14 are placed to the left and right of the space 5 near the outer periphery of the lower half 2, so as to reinforce the triangle-shaped space 5 of the magnetic tape cassette.

Figure 3A:
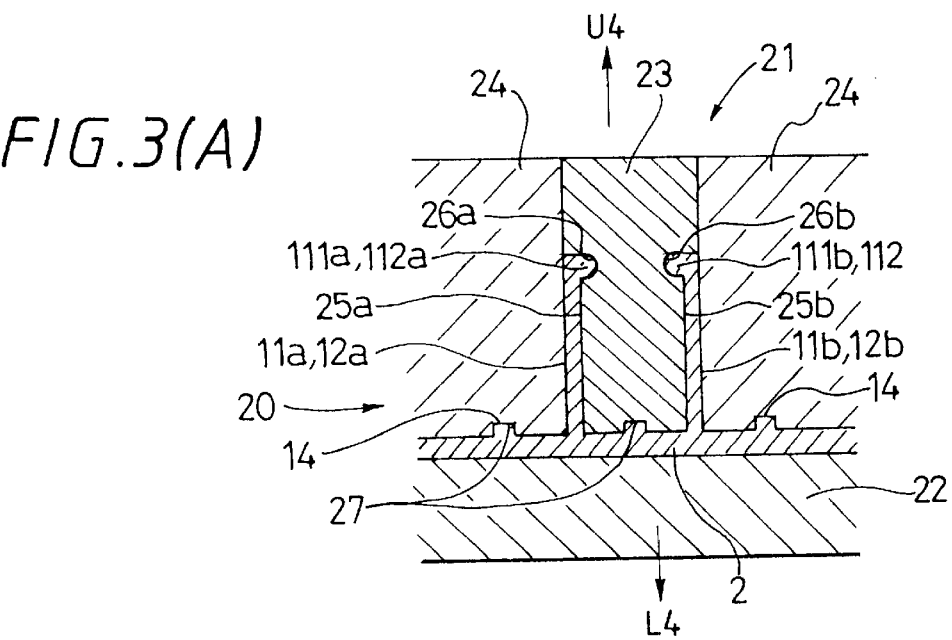
FIGS. 3(A) to (C) illustrate the mold apparatus and the magnetic tape cassette molding method according to the present invention, showing the order of the molding steps thereof.
Figure 3B:
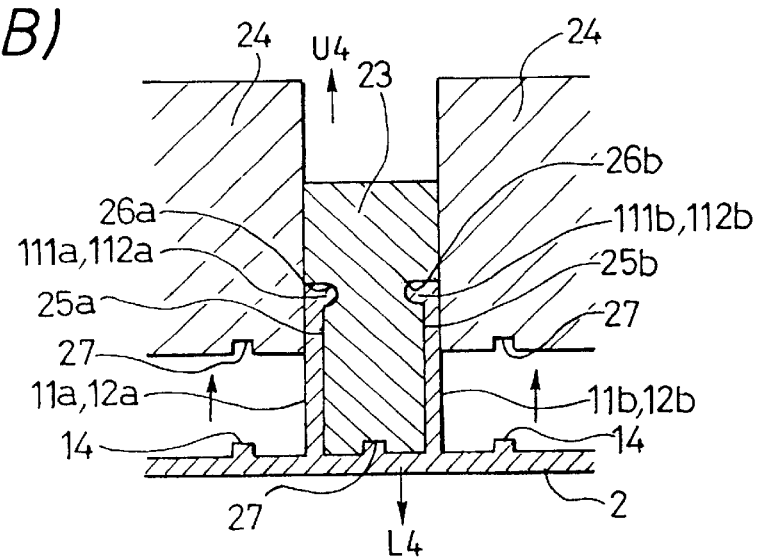
Figure 3C:
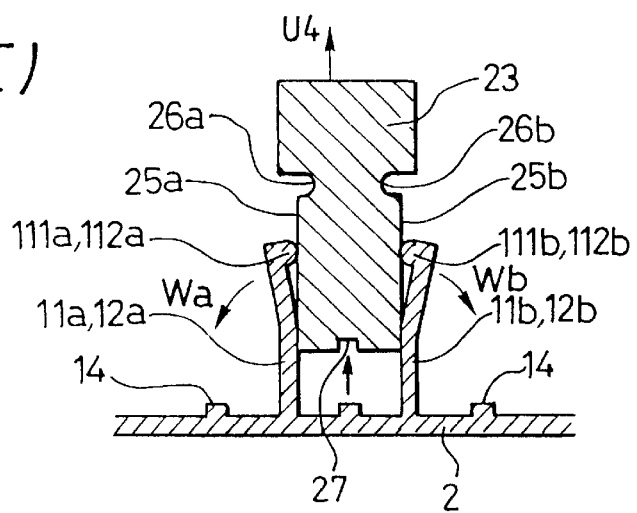

FIGS. 3(A) to (C) illustrate the method for molding the lower half 2 of the magnetic tape cassette, according to the present invention. A metal mold 20 used for performing this molding method is composed of an upper mold 21 and a lower mold 22. The lower mold 22 can be composed of a single mold. On the other hand, the upper mold 21 is composed of both a guide wall inner mold 23 and a guide wall outer mold 24. The guide wall inner mold 23 and the guide wall outer mold 24 define a cavity between the guide walls 11a and 11b, 12a and 12b.

The guide wall inner mold 23 forms the guide walls 11a and 11b, 12a and 12b. The guide wall inner mold 23 has flat portions 25a and 25b that are preferably erected in the vertical direction on the lower half 2. In addition, the guide wall inner mold 23 has curved-groove portions 26a and 26b that are grooved more inwardly than the flat portions 25a and 25b, and are used for forming the brake member removal-prevention projections 111a, 111b and 112a, 112b. The flat portions 25a and 25b and the curved-groove portions 26a and 26b are arranged in the substantially triangle-shaped space 5 shown in FIG. 2. The arrangement preferably corresponds to the front and back portions of the space 5 of the magnetic tape cassette 1 to be molded.

As shown in FIGS. 3(A) to (C), recessed grooves 27, which are used to shape ribs 14, are formed on the bottom surface of the guide wall inner mold 23. In practical use, the one pair of guide walls 11a and 11b need not be arranged so as to form a row with the other pair of guide walls 12a and 12b.

As shown in FIGS. 3(A) to (C), the guide wall outer mold 24 of the upper mold 21 is structured such that the inside portions thereof are formed as flat and vertical surfaces. Grooves 27 located on the bottom surface of the guide wall outer mold 24 are used to mold the ribs 14. On the other hand, the lower mold 22 is structured so as to have a flat upper surface.

As shown in FIG. 3(A), in order to injection-mold the lower half 2 of the magnetic tape cassette 1, the metal mold 20 is first assembled. That is, the lower mold 22 and the upper mold 21, which is composed of the guide wall inner mold 23 and the guide wall outer mold 24, are assembled.

Resin is then injected into the cavity defined by the metal mold 20, and the lower half 2 (shown in FIGS. 3(A) to (C)) is molded.

After the lower half 2 is molded, the lower mold 22 is separated from the lower half 2 in the direction L4, as shown in FIG. 3(A). The guide wall outer mold 24 is then separated from the newly molded lower half 2 in the direction U4, as shown in FIG. 3(B). Because there are no recessed portions in the guide wall outer mold 24, the guide wall outer mold 24 can be removed with ease. Alternatively, the lower mold 22 may be removed after the guide wall outer mold 24 and the guide wall inner mold 23 of the upper mold 21 are removed from the molded lower half 2.

Then, as shown in FIG. 3(C), the guide wall inner mold 23 of the upper mold 21 is removed from the lower half 2 in the direction U4. The guide wall outer mold 24 must be removed before the guide wall inner mold 23 so that the guide wall inner mold 23 can be removed smoothly. That is, after the guide wall outer mold 24 is removed, the molded guide walls 11a, 11b, 12a and 12b, as shown in FIG. 3(C), may be elastically deformed in the widening direction Wa and Wb. This removal operation is termed "forcible removal". Additionally, because each lower end of the brake member removal-prevention projections 11a, 111b, 112a and 112b has a surface that is curved in cross section, the guide walls 11a, 11b, 12a and 12b can be elastically deformed more smoothly while removing the guide wall inner mold 23.

With the conventional molding method described in the background section of this application, the structure of the apparatus determines the method of removal. Therefore, the guide walls having the brake member removal-prevention projections are unable to be molded at positions far from the releasing pin insertion hole 10.

On the other hand, according to the present invention, the lower half 2 of the magnetic tape cassette 1 can be injection-molded even though the magnetic tape cassette 1 has guide walls 11a, 11b, 12a and 12b including brake member removal-prevention projections 111a, 111b, 112a and 112b. That is, the guide wall inner mold 23 can be removed easily even when the guide walls having the brake member removal-prevention projections are located at positions far from the releasing pin insertion hole 10. This removal is easily accomplished because the upper mold 21 is divided into the guide wall inner mold 23 and the guide wall outer mold 24, and the guide wall outer mold 24 is removed before the guide wall inner mold 23.

Since the brake member removal-prevention projections 111a, 111b, 112a and 112b of the guide walls 11a, 11b, 12a and 12b support the brake member 7 from above, the brake member 7 can be slid more smoothly than the conventional device. Furthermore, the additional support provided by the four projections virtually eliminates the possibility that the brake member 7 will become dislodged from the guide walls 11a and 11b, 12a and 12b.

In the above-mentioned embodiment, the two pairs of guide walls 11a, 11b and 12a, 12b may be respectively provided in the front and rear portions of the brake member 7. However, the invention is not limited to this structure. The invention may, for example, instead include a pair of long guide walls extending from the front to the rear portions of the brake member 7. Such a structure also permits the components molds to be removed with ease, and can prevent the brake member 7 from being dislodged from the guide walls 11a, 11b, 12a, 12b.

As has been described hereinabove, according to the present invention, the upper mold is divided into a guide wall inner mold and a guide wall outer mold. First, the guide wall outer mold is removed in the upward and vertical direction. Next, the guide wall inner mold is removed in the same direction. Owing to this, it is possible to produce, by injection-molding resin using the metal mold 10, a magnetic tape cassette that has guide walls located in a position far from the releasing pin insertion hole.

Additionally, it is surely possible to prevent the brake member from becoming dislodged from the guide walls, even though the guide walls are located in positions far from the releasing pin insertion hole 10.

The present application is based on Japanese Patent Application No. Hei. 9-161441, which is incorporated herein by reference.

While only certain embodiments of the invention have been specifically described herein, it will be apparent that numerous modifications may be made thereto without departing from the spirit and scope of the invention.

What is claimed is:

1. A mold apparatus for injection-molding a magnetic tape cassette having a pair of mutually opposing guide walls respectively erected on an upper surface of a half-case of said magnetic tape cassette, said opposing guide walls for slidably supporting a brake member that locks rotations of a pair of tape winding reels disposed within said magnetic tape cassette, wherein each of said guide walls has a projection for preventing said brake member from being dislodged from between said guide walls, said mold apparatus comprising:

a first mold, removable in a direction opposite the erected direction of said guide walls, for forming a lower surface of said half-case;

a second mold, removable in the erected direction of said guide walls, for forming outer side surfaces of said guide walls, wherein said second mold includes opposed surfaces for forming the outer surfaces of said guide walls, said opposed surfaces constituted by straight, parallel surfaces; and a third mold, removable in the erected direction of said guide walls, for forming guide wall inner side surfaces to be brought into contact with said brake member, and including flat portions for respectively forming the guide wall inner side surfaces and grooved portions for respectively forming said projections of said guide walls, wherein said grooved portions are grooved more inwardly than the flat portions so that said third mold forms an entire top portion of the projection of each of said guide walls;

wherein said first, second and third molds form a molding cavity defined by said pair of mutually opposing guide walls, wherein each of said projections has a surface that is curved in cross section.

2. The mold apparatus according to claim 1, wherein said projections are respectively positioned at leading ends of said guide walls.

3. The mold apparatus according to claim 2, wherein each of said projections has a surface that is curved in cross section.

4. The mold apparatus according to claim 1, wherein at least two pairs of said guide walls are arranged at a predetermined interval in a sliding direction of said brake member.

5. The mold apparatus according to claim 4, wherein said projections are respectively positioned at leading ends of said guide walls.

6. The mold apparatus according to claim 5, wherein each of said projections has a surface that is curved in cross section.

* * * * *